United States Patent [19]

Chlanda et al.

[11] Patent Number: 4,608,141
[45] Date of Patent: Aug. 26, 1986

[54] MULTICHAMBER TWO-COMPARTMENT ELECTRODIALYTIC WATER SPLITTER AND METHOD OF USING SAME FOR BASIFICATION OF AQUEOUS SOLUBLE SALTS

[75] Inventors: Frederick P. Chlanda, Rockaway; Krishnamurthy N. Mani, Denville, both of N.J.

[73] Assignee: Allied Corporation, Morris Township, Morris County, N.J.

[21] Appl. No.: 669,450

[22] Filed: Nov. 7, 1984

[51] Int. Cl.$^4$ .......................................... B01D 13/02
[52] U.S. Cl. ................................ 204/182.5; 204/98; 204/301
[58] Field of Search ...................... 204/98, 128, 180 P, 204/301

[56] References Cited

U.S. PATENT DOCUMENTS

| | | | |
|---|---|---|---|
| 2,829,095 | 4/1958 | Oda et al. | 204/98 |
| 3,046,211 | 7/1962 | Tye | 204/180 P |
| 3,111,472 | 4/1958 | Oda et al. | 204/180 |
| 3,124,522 | 3/1964 | Arden et al. | 204/180 P |
| 3,239,442 | 3/1966 | Tirrell | 204/180 P |
| 3,318,788 | 5/1967 | Mintz | 204/180 P |
| 3,341,441 | 9/1967 | Giuffriola et al. | 204/180 P |
| 3,455,804 | 7/1969 | Justi et al. | 204/180 P |
| 3,562,139 | 2/1971 | Leitz | 204/180 P |
| 3,654,125 | 4/1972 | Leitz | 204/180 P |
| 3,703,508 | 11/1972 | Heit et al. | 204/180 P |
| 3,725,235 | 4/1973 | Mintz | 204/180 P |
| 3,788,959 | 1/1974 | Smith | 204/180 P |
| 3,870,613 | 3/1975 | Nakamura et al. | 204/180 P |
| 3,905,886 | 9/1975 | Wang | 204/180 P |
| 4,110,175 | 8/1978 | Ahlgren et al. | 204/301 |
| 4,111,780 | 9/1978 | Murayama et al. | 204/180 P |
| 4,391,680 | 7/1983 | Mani et al. | 204/98 |

Primary Examiner—John F. Niebling
Assistant Examiner—Terryence Chapman
Attorney, Agent, or Firm—Gus T. Hampilos; Gerhard H. Fuchs

[57] ABSTRACT

A basified aqueous salt solution and an aqueous acid are generated in a multichamber two-compartment electrodialytic water splitter having unit cells comprised of a bipolar membrane, a first anion permselective membrane and at least one additional substantially non-porous, water-swollen non-cation permselective membrane disposed between an anion face of the bipolar membrane and a face of said first anion membrane thereby forming at least two base compartments and an acid compartment, positioned between an anode and a cathode. The method comprises the steps of:

(a) introducing a liquid comprising water to an acid compartment formed by a cation face of a bipolar membrane and a face of said first anion membrane;
(b) introducing a liquid comprising an aqueous soluble salt to a first base compartment formed by a face of said first anion membrane and a face of said at least one additional non-cation permselective membrane;
(c) serially transferring the liquid comprising the aqueous soluble salt from said first base compartment to the additional base compartment formed by a face of said at least one additional non-cation permselective membrane and an anion face of a bipolar membrane;
(d) passing direct current through said water splitter thereby adding hydroxyl ions to the additional base compartment, transferring hydroxyl ions through said at least one non-cation permselective membrane from the additional base compartment to the said first base compartment, anions from the first base compartments to the acid compartment, and adding hydrogen ions to the liquid comprising water in the acid compartment;
(e) withdrawing a liquid comprising aqueous acid from the acid compartment; and
(f) withdrawing a basified aqueous soluble salt from the additional base compartment.

18 Claims, 6 Drawing Figures

MULTICHAMBER TWO-COMPARTMENT ELECTRODIALYTIC WATER SPLITTER AND METHOD OF USING SAME FOR BASIFICATION OF AQUEOUS SOLUBLE SALTS

BACKGROUND OF THE INVENTION

The present invention relates to a multichamber base compartment two-compartment electrodialytic water splitter and a method of using same to produce an aqueous soluble basified salt solution and aqueous soluble acid at increased current efficiency.

Electrodialytic water splitting in a two-compartment cell is well known. For example, U.S. Pat. No. 4,391,680 filed by the same inventors discloses generation of strongly acidified sodium chloride and aqueous sodium hydroxide by two-compartment water splitting of aqueous sodium chloride. However, when generating strong bases in a two-compartment electrodialytic water splitter, the efficiency for base generation falls rapidly as the concentration of base in the base compartment increases due to migration of hydroxyl ions across the anion membrane from the base compartment into the acid compartment.

Various methods have been employed in the prior art in an attempt to overcome the decrease in current efficiency with increased concentration of base in the base compartment. For example, a three-compartment electrodialytic water splitter comprised of alternating bipolar, anion and cation permselective membranes thereby forming alternating acid, salt and base compartments is disclosed in our copending patent application Ser. No. 474,771, filed Mar. 14, 1983. In addition, the staging of two conventional two-compartment electrodialytic water splitters whereby the base solution withdrawn from the base compartment of one two-compartment water splitter is fed to the base compartment of a second two-compartment water splitter is known. In an attempt to increase the efficiency of the bipolar membrane, U.S. Pat. No. 3,111,472 (Oda et al.) discloses disposing a microporous water permeable cation or neutral membrane in the acid and/or base compartments of a three-compartment electrodialytic water splitter. However, Oda's apparatus and method does not overcome the lower efficiency due to migration of the hydroxyl ions through the membranes into the salt and/or acid compartments.

All of these prior art disclosures require installation of auxilliary equipment and separate additional process steps, both of which increase costs. In view of the foregoing, the industry has endeavored to develop a process capable of producing highly basic aqueous brine at low cell voltage. To date, this had not been achieved.

SUMMARY OF THE INVENTION

In accordance with the present invention there is provided a method for generating a basified aqueous salt solution and an aqueous acid in a two-compartment electrodialytic water splitter having at least one unit cell, each unit cell comprised of a bipolar membrane, a first anion permselective membrane and at least one additional substantially non-porous, water-swollen, non-cation permselective (i.e. anion permselective or neutral) membrane wherein said at least one non-porous, water-swollen, non-cation permselective membrane is disposed between an anion face of said bipolar membrane and a face of said first anion membrane thereby to define a unit cell comprising an acid compartment, a first base compartment and at least one additional base compartment, positioned between an anode and a cathode, which comprises the steps of:

(a) introducing a liquid comprising water to an acid compartment formed by a cation face of a bipolar membrane and a face of said first anion membrane;

(b) introducing a liquid comprising an aqueous soluble salt into the first base compartment defined by a face of said first anion membrane and a face of said at least one non-cation membrane;

(c) serially transferring the liquid comprising the aqueous soluble salt from the first base compartment to the at least one additional base compartment defined by a face of said at least one non-cation permselective membrane and an anion face of a bipolar membrane;

(d) passing direct current through said electrodialytic water splitter thereby adding hydrogen ions to the liquid in the acid compartment, adding hydroxyl ions to the liquid comprising an aqueous soluble salt in the at least one additional base compartment, and transferring hydroxyl ions through said at least one non-cation permselective membranes to the first base compartment from said at least one additional base compartment;

(e) withdrawing a liquid comprising aqueous acid from the acid compartment; and (f) withdrawing a basified aqueous soluble salt from said at least one additional base compartment.

In addition there is also provided an improved apparatus for production of basified aqueous soluble salt and aqueous soluble acid comprising:

(a) cell container;

(b) a unit cell comprised of a bipolar and an anion permselective membrane thereby forming alternating acid and base compartments positioned between two electrodes;

(c) means to add liquid into each base compartment;

(d) means to withdraw liquid from each base compartment;

(e) means to add liquid into each acid compartment; and (f) means to withdraw liquid from each acid compartment, the improvement which comprises:

at least one additional substantially non-porous, water-swollen anion permselective or neutral membrane disposed between an anion face of a bipolar membrane and a face the anion permselective membrane thereby forming a first base compartment and at least one additional base compartment and means to transfer liquid to said at least one additional compartment from the first base compartment, said first base compartment being formed by a face of the anion membrane and a face of at least one additional substantially non-porous, water-swollen non-cation permselective membrane.

DETAILED DESCRIPTION OF THE INVENTION

Figure 1:
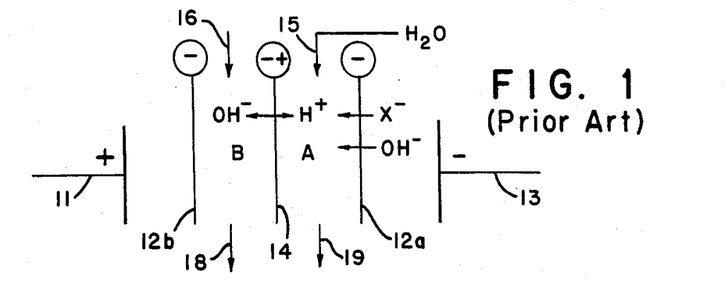
FIG. 1 schematically illustrates the ion transport in a conventional two-compartment electrodialytic water splitter of the prior art.
Figure 4:
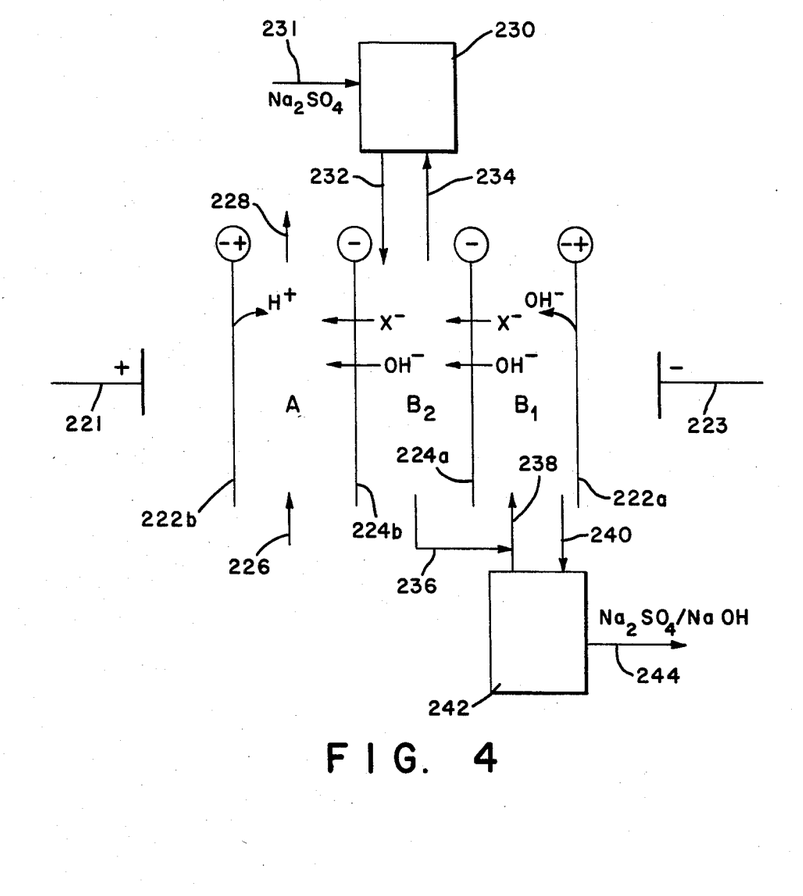
FIG. 4 schematically illustrates another preferred embodiment of the present invention employing two base stage, two-compartment multichamber electrodialytic water splitter of the present invention.

The present invention provides a multichamber base compartment two-compartment electrodialytic water splitter useful for the production of basified aqueous salt solution that operates at a higher overall current efficiency than the two-compartment electrodialytic water splitters of the prior art and at higher overall current efficiency and lower cell voltage than the three-compartment electrodialytic water splitters of the prior art. A prior art two-compartment electrodialytic water splitter, as illustrated in FIG. 1 contains alternating bipolar and anion permselective membranes disposed between two electrodes, thereby forming alternating acid and base compartments. The multichamber base compartment two-compartment electrodialytic water splitter of the present invention (such as illustrated in FIG. 4) includes at least one additional substantially non-porous, water-swollen non-cation membrane disposed between an anion face of the bipolar and a face of the anion permselective membrane thereby forming at least an additional base compartment, $B_1$, bounded by an anion face of the bipolar and a face of the substantially non-porous, water-swollen non-cation permselective membrane and a first base compartment, $B_2$, bounded by another face of the substantially non-porous, water-swollen non-cation permselective membrane and a face of the first anion permselective membrane bounding the acid compartment. While the prior art desirably operated a two-compartment water splitter in the staging or batch recirculating mode, such staging or batch recirculation was often impractical especially when the basified brine was fed to a continuous process. While three-compartment electrodialytic water splitters in the prior art were used to produce basified brine, the cation membranes of the three-compartment electrodialytic water splitter are more prone to fouling by heavy metal hydroxides than anion membranes. The multichamber base compartment two-compartment electrodialytic water splitter of the present invention operates without need for staging and without cation membranes thereby providing higher overall current efficiency and lower average cell voltage than previously possible.

In accordance with a preferred embodiment of the present invention illustrated in FIG. 4, by feeding aqueous soluble salt to the first base, $B_2$, adjacent to the acid compartment and nearest the cation face of the bipolar membrane and by serially transferring aqueous soluble salt from $B_2$ to $B_1$ wherein hydroxyl is added, a basified aqueous salt solution may be produced and withdrawn from the at least one additional base compartment $B_1$, bounded by the anion face of the bipolar and a face of the substantially non-porous, water-swollen non-cation permselective neutral membrane. In this way, the present invention minimizes the neutralization of $OH^-$ by $H^+$ and thereby increases the overall efficiency for production of both $H^+$ and $OH^-$.

By the term "basified brine" as used herein is meant an aqueous salt solution wherein at least about 1-50 percent by weight of the soluble salt MA has been converted into the corresponding monohydroxide base MOH, depending upon the degree of ionization thereof. The invention is particularly useful for production of basified brine from nitrates, chlorides, sulfates and bromides.

The prior art two-compartment water splitter illustrated in FIG. 1 incorporates a plurality of anion 12a, 12b and bipolar ion exchange 14 membranes arranged in an alternating fashion between two electrodes 11 and 13 thus forming an electrodialysis stack.

In FIG. 1, $OH^-$ produced in B by a bipolar membrane 14 is introduced into a salt solution MA so that a basified salt solution is produced and withdrawn via line 18. The efficiency of the process is determined in part by the ratio of $OH^-$ and $A^-$ crossing anion membrane 12b. As the basicity of the salt solution is increased, more and more of the current will be carried across the anion membranes by $OH^-$ thereby causing a reduction in efficiency for acid and base production.

The present invention is useful for the production of basified brine at a higher overall current efficiency, compared to prior art two- and three-compartment water splitters (having respectfully, alternating bipolar and anion exchange membranes and alternating bipolar, anion and cation exchange membranes) so long as $OH^-$ migrating into the acid increases as the $OH^-$ concentration in brine increases.

The nature of the invention will be better understood with reference to the description of the Figures hereinbelow.

Figure 2:
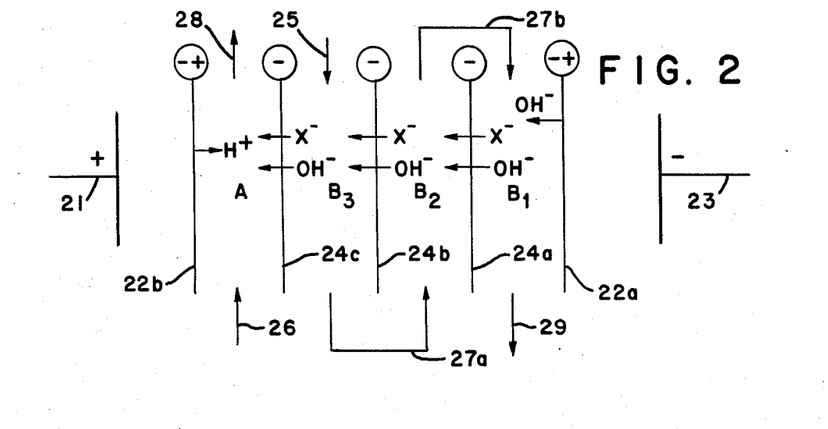
FIG. 2 schematically illustrates the ion transport in a preferred embodiment of the present invention employing two additional substantially non-porous, water-swollen non-cation permselective membranes.

FIG. 2 which shows a unit cell of a preferred multichamber two-compartment water splitter of the present invention. The cell shown may be considered to have three stages since there are three base compartments, $B_1$, $B_2$ and $B_3$. The construction of a basic electrodialysis stack is well known and, for example, the units commercially available from Asahi Glass Co., 1-2, Marunochi 2-chome, Chiyoda-ku, Tokyo, Japan; Ionics, Inc., Watertown, Mass., and other commercial sources may be modified in accordance with the present invention. In general, stacks which are suitable for electrolyte concentration, such as the Asahi Model CU-IV, may be used as multichamber base compartment-two-compartment water splitters after modification in view of the present invention (note, however, the bipolar membrane used therein must be of a kind adaptable to water splitting). While the use of bipolar membranes is preferred because of the simplicity of the equipment, the water splitting operation may be carried out by using a third compartment containing anions or cations incapable of passing through the anion and cation membranes on either side of the compartment as described, for example, in U.S. Pat. Nos. 3,704,218 and 3,705,846 (this arrangement, when used for water splitting, operates by the same principles as the bipolar membrane). The bipolar membrane or its equivalent converts water into hydrogen and hydroxyl ion. The water splitter employs suitable bipolar membranes that are described, for example, in U.S. Pat. No. 2,829,095 (which has reference to water splitting generally); in U.S. Pat. No. 4,024,043 (single film bipolar membrane); and in U.S. Pat. No. 4,116,889 (cast bipolar membrane). Other types of bipolar membranes which effectively convert water into hydrogen and hydroxyl ions may also be employed.

The current passed through the water splitter in conventional fashion is direct current of a voltage dictated by design and performance characteristics readily apparent to the skilled artisan and/or determined by routine experimentation. Current densities between 50 and 250 amps per square foot (between 55 and 270 milliamps per square centimeter) are preferred; and current densities between 80 and 150 amps per square foot (between 85 and 165 milliamps per square centimeter) are more preferred. Higher or lower current densities are contemplated, however, for certain specific applications.

The anion permselective membrane found useful as the first anion membrane which defines the acid compartment nearest the cation face of the bipolar membrane (FIG. 2) is a strongly basic anion permselective membrane. Particularly useful anion membranes are available from Asahi Glass Co. under the trade name Selemion ® AMV or ASV anion membranes, and Ionics, Inc. (sold as Ionics 204-UZL-386) anion membranes.

The additional membranes positioned between anion faces of a bipolar membrane and the face of the first anion membrane thereby forming at least two base compartments may be anion permselective or neutral membranes which are substantially non-porous (to water) and water-swollen. The term "substantially non-porous (to water)" as used herein in reference to membranes defines a membrane having a water or hydraulic permeability of no more than about 1 mL of water/dm$^2$ of membrane area per hour at 1 meter of water pressure. Lower values of hydraulic permeability, such as $1 \times 10^{-1}$ mL/dm$^2$ per hour at 1 meter of water pressure are preferred. No lower limit for hydraulic permeability has been found critical to operating the present invention so long as the additional substantially non-porous, water-swollen anion or neutral membrane allows transport therethrough of water molecules accompanying ions under the influence of applied direct current.

The term "water-swollen" as used herein with reference to membranes means water-insoluble and bibulous.

Among the anion membranes found useful as additional substantially non-porous, water-swollen anion membranes are strongly or moderately or weakly basic anion membranes such as are described above.

The substantially non-porous, water-swollen neutral membranes useful in the present invention are non-ion selective; i.e., cation- and anion-permeable. Among the neutral membranes found useful in the present invention are:

substantially non-porous, water-insolubilized, bibulous films or coatings of lower alkyl cellulose ethers such as methyl, ethyl or propyl cellulose ethers, hydroxylethyl or hydroxypropyl cellulose ethers; regenerated cellulose materials such as cellophane; polymers prepared by interpolymerizing a difunctional vinyl monomer, e.g. divinylbenzene with a non-ionic hydrophilic monomer such as vinyl ethers, vinyl alcohols, N-vinyl pyrrolidone and substituted derivatives thereof; polymers and copolymers of methyl methacrylate; polyamides such as nylons; and aromatic polyamides. Particularly useful neutral membranes includes substantially non-porous, water-insolubilized, bibulous films or coatings of the following: cellophane; hydroxyethyl cellulose, hydroxylpropyl cellulose; polyvinyl alcohol; copolymers of vinyl acetate and vinyl pyrrolidones, di and monoethylene glycol methacrylate; cross-linked hydroxyethyl methacrylate; polyelectrolyte complexes, copolymers of methyl methacrylate and glycerol methacrylate; copolymers of hydroxypropyl methacrylate and methyl methacrylate; copolymers of polyvinyl pyrrolidone and methylene bis-4-phenyl isocyanate and copolymers of polyvinyl pyrrolidone and styrene or divinyl benzene.

The aqueous soluble salt found useful in the present invention is selected from halides, sulfates, phosphates, cyanides or nitrates. The preferred halide is chloride but fluorides may also be used. The preferred cations are alkali metal cations and $NH_4^+$. Among the particularly useful aqueous soluble salts are sodium and potassium chloride, sulfate, phosphate and nitrate and especially NaCl, $Na_2SO_4$, KCl and $K_2SO_4$.

The operation of the three-stage or three-base chamber, two-compartment electrodialytic water splitter of a preferred embodiment of the invention is further described below by reference to FIG. 2. The aqueous soluble salt solution, for example alkali metal chloride or alkali metal sulfate or mixtures thereof, is fed via line 25 into base chamber $B_3$. Generally, it will have a pH between 6 and 13, with basic solutions (e.g. pH 8-12) being usually those coming from a purification step in which base (e.g. carbonate or hydroxide) has been added to impure, naturally occurring salt solution to precipitate polyvalent metals such as calcium, aluminum, magnesium and the like. However, the pH of the solution fed to the first compartment is not critical.

The concentration of the aqueous soluble salt in the feed solution in line 25 may be as low as 2 weight percent for alkali metal chloride, and may be as high as the solubility of the alkali metal chloride in water. Preferably, for alkali metal chloride, the salt concentration in the feed solution is between 5 weight percent (more preferably 10 weight percent) and the saturation concentration of the salt.

The liquid fed via line 26 to the acid compartment may be water alone, or may be water with any of a variety of electrolytes in it. Preferably, this liquid is neutral or acidic (pH 1-7), and more preferably it is aqueous monohydride, e.g. hydrochloric acid of a concentration between 1 and 50 weight percent (more preferably between 5 and 25 weight percent). The desired concentration (the actual feed to the acid compartment) may be achieved by recycle, staging or a combination thereof as described in more detail below. In addition, the liquid added to the acid compartment may be the aqueous hydrochloric acid recycled from the acid compartment.

The three acid stage two-compartment electrodialytic water splitter illustrated in FIG. 2 incorporates a plurality of unit cells each comprised of one bipolar membrane, 22a, two substantially non-porous, water-swollen anion permselective or neutral membranes 24a, 24b, and an anion permselective membrane 24c, and one bipolar membrane 22b thereby forming first base compartment, $B_1$, second base compartment, $B_2$, and third base compartment, $B_3$, and acid compartment, A, arranged in an the fashion as shown in FIG. 2 between two electrodes anode 21 and cathode 23. In operation, a direct current passes from anode 21 to the cathode 23. An aqueous soluble salt solution in line 25 (for example aqueous sodium chloride) is fed to third base compartment $B_3$. Hydroxyl ions which are generated at bipolar membrane 22a migrate through membranes 24a, 24b and 24c into acid compartment A and at the same time, anions such as chloride in base compartment $B_3$ migrate through anion membrane 24c into acid compartment A towards anode 21. An aqueous soluble salt solution from B$_3$ which may be acidic, neutral or basic, preferably basic, is removed therefrom via line 27a and fed into second base compartment B$_2$. Hydroxyl ions and anions in B$_1$ migrate through non-cation permselective membrane 24a into second base compartment B$_2$. An aqueous soluble salt solution produced in B$_2$ which may be neutral or basic, preferably basic, is removed from chamber B$_2$ via line 27b and fed to base compartment B$_1$. Hydroxyl ions generated at bipolar membrane 22a are added to the aqueous soluble salt solution in B$_1$ and basified aqueous salt solution is produced in B$_1$ and withdrawn via line 29. By addition of the intermediate base chambers B$_1$, B$_2$ and B$_3$ which are connected in series by lines 27a and 27b, the third base compartment B$_3$, nearest the cation face of the bipolar membrane 22b, contains the lowest base concentration and the first base compartment B$_1$, nearest the anion face of bipolar membrane 22b contains the highest base concentration. This arrangement improves the efficiency for base generation over prior art two-compartment electrodialytic water splitter illustrated in FIG. 1. By decreasing the amount of migration of hydroxyl ions into the acid compartment, the efficiency of producing acid ions is increased. A liquid comprising water, preferably also comprising dilute monohydride acid is fed via line 26 into acid compartment A to which hydrogen ions generated at the cation face of bipolar membrane 22b are added. An aqueous hydrogen ion enriched solution is removed from the acid compartment A via line 28.

It is contemplated that the flow rates out of the different compartments may be the same or different. For example, the flow rates or the net flow rates after recycle out of the acid compartment may be considerably slower than that out of the base compartments such that hydrogen ion concentration in the product withdrawn from the acid compartment A is substantially greater than the base concentration in the basified aqueous salt solution withdrawn from the base chamber B$_1$. It is also contemplated that the flow rates may be adjusted such that the hydroxyl ion concentration in the basified aqueous salt withdrawn from the base B$_1$ is greater than the hydrogen ion concentration in the hydrogen enriched solution removed from the acid compartment A.

Figure 3:
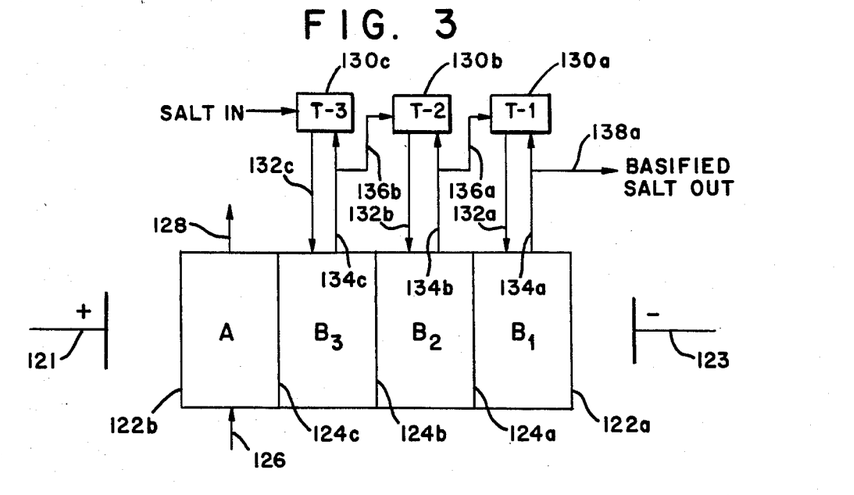
FIG. 3 schematically illustrates the stream flows for a preferred embodiment of the present invention employing a three base stage, two-compartment multichamber electrodialytic water splitter.

FIG. 3 illustrates another preferred embodiment of the process of the present invention. A feed/bleed apportionment method is used for feeding and withdrawing the aqueous soluble salt from base compartments B$_1$, B$_2$ and B$_3$. Aqueous soluble salt solution from a tank 130c (T-3) is fed via line 132c to third base compartment B$_3$. Aqueous soluble salt solution which may be neutral, basic, or acidic, preferably basic, is removed from chamber B$_3$ via line 134c. At least a portion of the aqueous soluble salt solution in line 134c is fed via line 136b, to tank 130b (T-2). The remainder of the aqueous soluble salt solution in line 134c is returned to tank 130c (T-3). While the composition of the aqueous soluble salt solution in lines 132c, 134c and 136b may be the same, it is preferable that the pH of the aqueous soluble salt solution in line 136b be more basic than that of the aqueous soluble salt solution in line 132c. Aqueous soluble salt solution from tank 130b (T-2) is fed via line 132b to the second acid compartment B$_2$. Aqueous soluble salt solution from base compartment B$_2$ is removed via line 134b. At least a portion of the aqueous soluble salt solution in line 134b is forwarded via line 136a to tank 130a (T-1). The remainder of the aqueous soluble salt solution which is preferably basic is forwarded via line 134b back to tank T-2. Soluble salt solution in line 132a is fed to first base compartment B$_1$ and an basified aqueous salt solution is removed from B$_1$ via line 134a. At least a portion of the basified aqueous soluble salt solution in line 134a is removed via line 138a and the remainder returned to tank T-1. In all other respects, the operation of the three acid stage two-compartment electrodialytic water splitter illustrated in FIG. 3 is the same as that described in reference to FIG. 2.

FIG. 4 illustrates another preferred embodiment of the present invention employing a two base stage two-compartment electrodialytic water splitter for production of basified aqueous sodium sulfate. Aqueous sodium sulfate is fed via line 231 to tank 230 and, in turn, from tank 230 via line 232 to second base compartment B$_2$ formed by a face of a substantially non-porous, water-swollen non-cation permselective membrane 224a and a face of an anion permselective membrane 224b. Under the influence of direct applied current through anode 221 and cathode 223, hydroxyl ions and sulfate ions migrate from first base compartment B$_1$ toward acid compartment A. As a result, some basified aqueous sodium sulfate solution produced in base compartment B$_2$ is removed via line 234 and supplied to tank 230. At least a portion of the basified sodium sulfate solution from B$_2$ is removed via line 236 and fed to line 238 for forwarding along with basified sodium sulfate from tank 242, to first base compartment B$_1$ formed by an anion face of bipolar membrane 222a and a face of the substantially non-porous, water-swollen non-cation permselective membrane 224a. The basified sodium sulfate solution produced from hydroxyl ions formed at the anion face of bipolar membrane 222a is removed from first base compartment B$_1$ via line 240 and supplied to tank 242. At least a portion of the basified aqueous sodium sulfate solution is removed from tank 242 via line 244. The operation of the acid compartment in FIG. 4 is analogous to that of the acid compartment in FIGS. 2 and 3.

Figure 5:
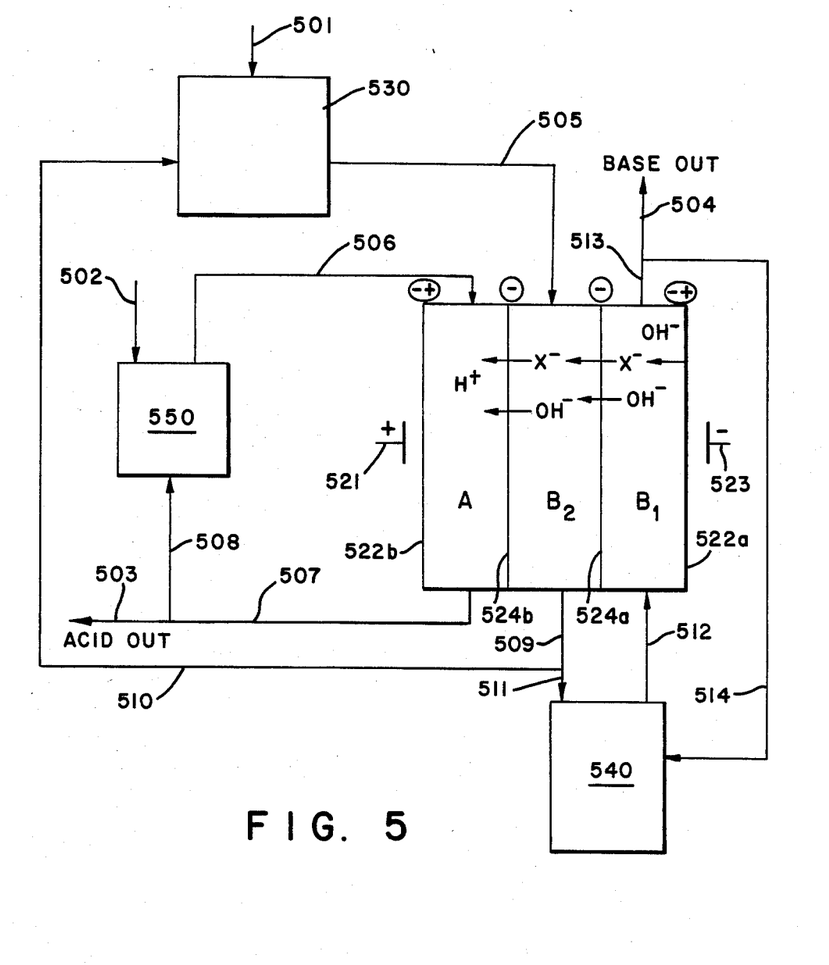
FIG. 5 schematically illustrates still another preferred embodiment of the present invention employing a two base stage, two-compartment multichamber electrodialytic water splitter of the present invention.

FIG. 5 illustrates still another preferred embodiment of the present invention employing a two base stage two-compartment electrodialytic water splitter for production of basified aqueous sodium sulfate. Aqueous sodium sulfate is fed via line 501 to tank 530 and via line 505 to base compartment B$_2$ formed by a face of a substantially non-porous, water-swollen non-cation permselective membrane 524a and a face of an anion permselective membrane 524b. Under the influence of direct applied current through anode 521 and cathode 523, hydroxyl ions and sulfate ions migrate toward the acid compartment A and hydrogen ions migrate toward base compartment B$_2$. At least a portion of the basified aqueous sodium sulfate solution produced in base compartment B$_2$ is removed via line 509 and fed back to tank 530 via line 510. The remainder of the basified sodium sulfate solution from B$_2$ removed via lines 509 is fed to line 511 and to supply tank 540. The basified aqueous sodium sulfate solution is removed from tank 540 via line 512 and forwarded to first base compartment B$_1$ formed by an anion face of bipolar membrane 522a and a face of the substantially non-porous, water-swollen non-cation perselective membrane 524a. A more basified sodium sulfate solution is formed by hydroxyl ions introduced at the anion face of bipolar membrane 522a, and this solution is removed from first base compartment B$_1$ via lines 513 and 504. At least a portion of the more basified aqueous sodium sulfate solution removed from base compartment B₁ via line 513 is recirculated to tank 540 via line 514. With respect to the acid cycle, water is added via line 502 to acid recirculation tank 550. An aqueous hydrogen enriched solution in recirculation tank 550 is removed via line 506 and fed to acid compartment A wherein hydrogen ions from a cation face of bipolar membrane 522b are introduced and combine with anions that migrate through anion membrane 524b from base compartment B₂. A hydrogen-enriched solution is produced in the acid compartment A and is removed via line 507. At least a portion of the solution in line 507 is recycled to tank 550 in line 508 and the remainder is removed from line 507 via line 503 as product.

The multichamber base compartment two-compartment electrodialytic water splitters of the present invention may be operated at any temperature between about 20° C. and 80° C., but more practically and conveniently between about 35° C. and 55° C. In the embodiment of the present invention illustrated in FIG. 4, we prefer to maintain temperatures of at least about 40° to about 55° in the electrodialytic stack; the overall current efficiency is improved by about 2 percent compared to operating with aqueous sodium sulfate in the base loop at temperatures less than about 40° C., for example, about 35° C.

Preferred embodiments of the present invention illustrated in FIGS. 2 and 3 incorporate three stages by disposing two substantially non-porous, water-swollen non-cation permselective membranes in the base compartment. FIGS. 4 and 5 incorporate two stages or two base compartments by disposing only a single substantially non-porous, water-swollen non-cation permselective membrane in the base compartment. The number of stages that may be incorporated into the base compartment is not critical and may be varied from at least two up to about ten so long as the solution of lowest basicity enters the base compartment closest to the cation face of the bipolar membrane and flows serially to the base compartment closest to the anion face of the bipolar membrane, wherein a solution of highest basicity is produced. If there is only one stage, the water splitter will be an ordinary two-compartment water splitter as illustrated in FIG. 1.

Figure 6:
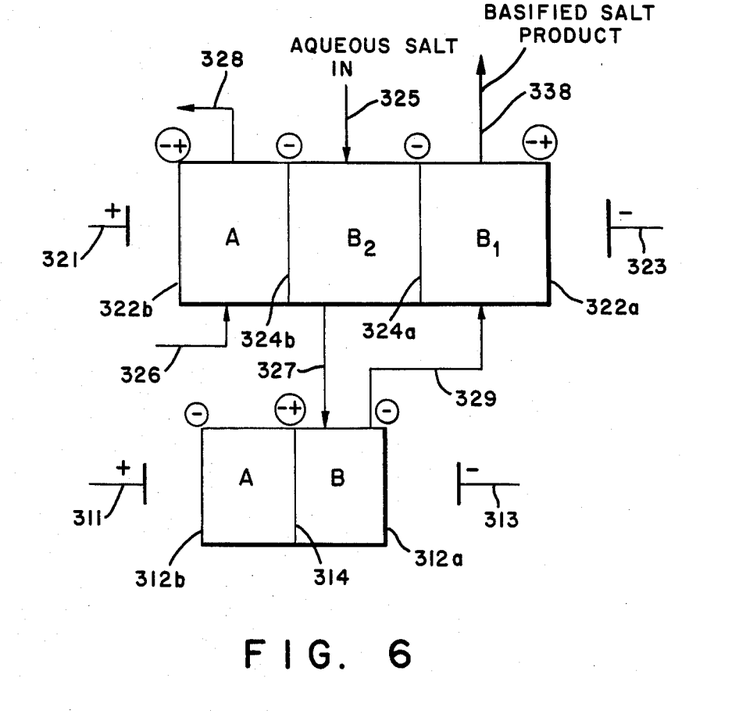
FIG. 6 schematically illustrates another preferred embodiment of the present invention illustrated in FIG. 4 and a prior art two-compartment electrodialytic water splitter.

It is also possible to use the multichamber method in conjunction with conventional two-compartment water splitting advantageously. In this arrangement, one of the intermediate streams from the multichamber unit can be introduced into an ordinary two-compartment water splitter with the product from the two-compartment water splitter being reintroduced into the multichamber unit. An example of such an arrangement is shown in FIG. 6.

Aqueous soluble salt is supplied via line 325 to base compartment B₂ of a two stage two-compartment water splitter. The product solution formed in base compartment B₂, preferably basic, is removed via line 327 and supplied to base compartment B of a conventional two-compartment water splitter. The basified product formed in base compartment B is removed via line 329 and supplied to base compartment B₁ of the two stage two-compartment splitter. A more basified aqueous soluble salt is formed in base compartment B₁ and removed via line 338. The design of the two stage two-compartment water splitter is the same as described with reference to FIG. 4 (the reference numerals have been changed from the 200 series in FIG. 4 to the 300 series in FIG. 6). Similarly, the design of the two-compartment water splitter is the same as described with reference to FIG. 1 (with the reference numerals in FIG. 1 being prefixed with the number 3 in FIG. 6).

What is claimed is:

1. A method for generating a basified solution and an aqueous acid comprising the steps of:
   (a) providing an electrodialytic water splitter comprising at least one unit cell disposed between an anode and a cathode, a unit cell having at least a first base compartment, a second base compartment and an acid compartment arranged such that the acid compartment and first base compartment are defined in part by a common first membrane and such that the first base compartment and the second base compartment are defined in part by a common second membrane;
   (b) introducing a liquid comprising water to the acid compartment;
   (c) introducing a liquid comprising an aqueous soluble salt to the first base compartment;
   (d) withdrawing liquid from the first base compartment and transferring at least a portion of the liquid from the first base compartment to the second base compartment;
   (e) passing direct current through said electrodialytic water splitter to produce a liquid comprising aqueous acid in said acid compartment, a liquid comprising aqueous soluble salt and a first concentration of hydroxyl ions in said first base compartment, and a liquid comprising aqueous soluble salt and a second concentration of hydroxyl ions in said second base compartment, said second concentration of hydroxyl ions being greater than said first concentration of hydroxyl ions;
   (f) withdrawing the liquid comprising aqueous soluble salt and a second concentration of hydroxyl ions from said second base compartment.

2. The method of claim 1 wherein the first membrane is an anion permselective membrane.

3. The method of claim 2 wherein the second membrane is a substantially non-porous, water-swollen, non-cation permselective membrane.

4. The method of claim 3 wherein the substantially non-porous, water-swollen, non-cation permselective membrane is a non-porous, water-swollen, anion permselective membrane.

5. The method of claim 3 wherein the substantially non-porous, water-swollen, non-cation permselective membrane is a non-porous, water-swollen neutral membrane.

6. The method of claim 3 wherein the acid compartment is further defined by means for introducing a source of hydrogen ions to the acid compartment, and said second base compartment is further defined by means for introducing a source of hydroxyl ions to said second base compartment.

7. The method of claim 6 wherein the means for introducing hydroxyl ions is an anion face of a bipolar membrane, and wherein the means for introducing hydrogen ions is a cation face of a bipolar membrane.

8. The method of claim 1 wherein the unit cell further comprises a third base compartment arranged such that the second base compartment and the third base compartment are defined in part by a common third membrane and further comprising the steps of transferring the liquid comprising soluble salt and a second concentration of hydroxyl ions withdrawn from said second base compartment to the third base compartment wherein the passage of current through said electrodialytic water splitter produces a liquid comprising aqueous soluble salt and a third concentration of hydroxyl ions, said third concentration of hydroxyl ions being greater than said second concentration of hydroxyl ions, and withdrawing the liquid comprising aqueous soluble salt and a third concentration of hydroxyl ions from said third base compartment.

9. The method of claim 1 further comprising the step of recycling a portion of liquid withdrawn from each base compartment back to the base compartment from which the liquid was withdrawn.

10. The method of claim 1 wherein the transferring step further comprises feeding liquid from the first base compartment through a base compartment of a second electrodialytic water splitter prior to supplying a liquid to the second base compartment.

11. An apparatus for producing a basified solution and an aqueous acid comprising:
(a) two electrodes; and
(b) at least one unit cell arranged between said two electrodes, a unit cell comprising, in series:
  (1) first means for splitting water into hydrogen ions and hydroxide ions comprising a cation permselective membrane portion and an anion permselective membrane portion;
  (2) at least one anion permselective membrane arranged opposite said cation permselective membrane portion and spaced therefrom;
  (3) at least one substantially non-porous, water-swollen, non-cation permselective membrane arranged opposite said anion permselective membrane and spaced therefrom; and
  (4) second means for splitting water into hydrogen ions and hydroxide ions comprising an anion permselective membrane portion and cation permselective membrane portion, said anion permselective membrane portion being arranged opposite and spaced from the non-cation permselective membrane.

12. The apparatus of claim 11 wherein the substantially non-porous, water-swollen, non-cation permselective membrane is an anion permselective membrane.

13. The apparatus of claim 11 wherein the substantially non-porous, water-swollen, non-cation permselective membrane is a neutral membrane.

14. The apparatus of claim 11 wherein said first and second means are bipolar membranes.

15. The apparatus of claim 11 further including means associated with said container for supplying liquid from a compartment defined by the anion permselective membrane and the substantially non-porous, water-swollen, non-cation permselective membrane to a compartment defined by said second means and said substantially non-porous, water-swollen, non-cation permselective membrane membrane.

16. The apparatus of claim 11 wherein the unit cell further comprises at least one additional substantially non-porous, water swollen, non-cation permselective membrane disposed between said second means and said anion membrane to define at least one additional compartment therebetween.

17. A unit cell for use in an apparatus for forming basified solution and an aqueous acid, said unit cell comprising, in series and spaced apart: a bipolar membrane; at least one non-cation permselective membrane, an anion membrane and, a bipolar membrane.

18. A unit cell for use in an apparatus for producing a basified solution and an aqueous acid comprising:
first means for splitting water into hydrogen ions and hydroxide ions comprising an anion permselective membrane portion and a cation permselective membrane portion;
at least one substantially non-porous, water swollen, non-cation permselective membrane arranged opposite said anion permselective membrane portion and spaced therefrom;
an anion permselective membrane spaced an arranged opposite from said substantially non-porous, water-swollen, non-cation permselective membrane; and
second means for splitting water into hydrogen ions and hydroxide ions comprising a cation permselective membrane portion and an anion permselective membrane portion, said cation permselective membrane portion being arranged opposite and spaced from the anion permselective membrane.

* * * * *